INVENTOR.
ROBERT A. MUNSE
BY Malcolm W. Fraser
ATTORNEY

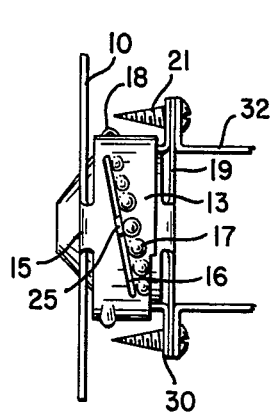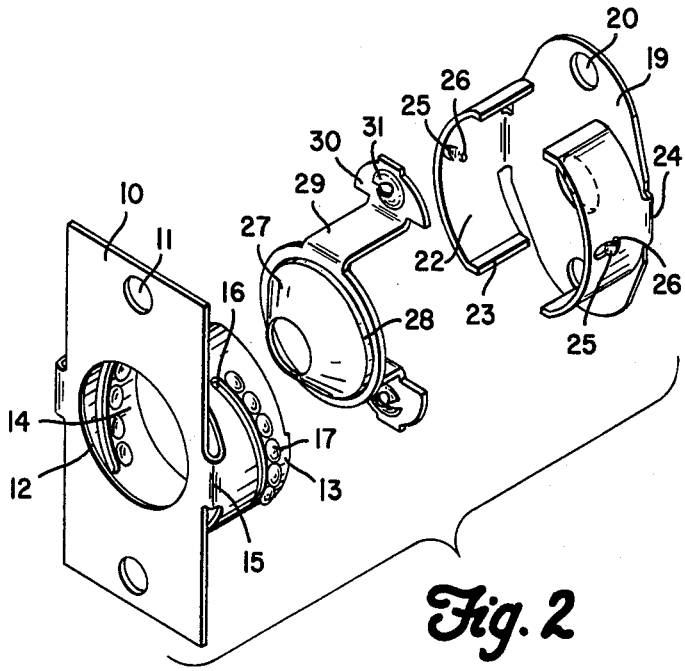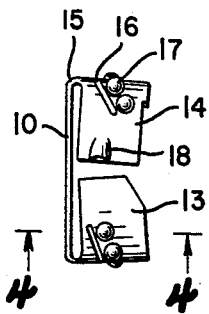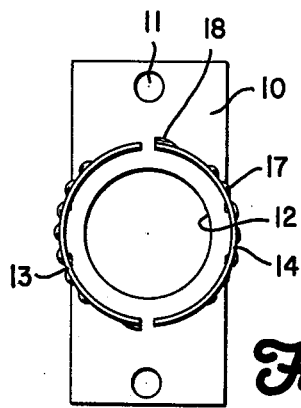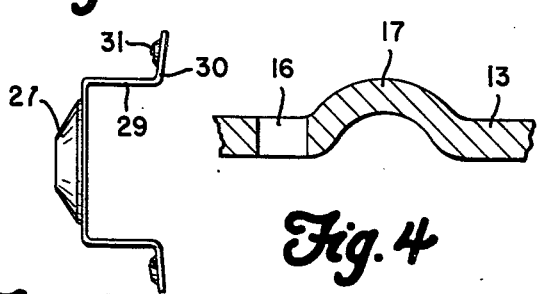
INVENTOR.
ROBERT A. MUNSE
BY Malcolm W. Fraser
ATTORNEY Jan. 22, 1963  R. A. MUNSE  3,074,287
ADJUSTING DEVICE FOR THERMOSTATS AND THE LIKE
Filed June 16, 1961  2 Sheets-Sheet 2

United States Patent Office 3,074,287
Patented Jan. 22, 1963

3,074,287
ADJUSTING DEVICE FOR THERMOSTATS AND THE LIKE
Robert A. Munse, Toledo, Ohio, assignor to Prestole Corporation, Toledo, Ohio, a corporation of Michigan
Filed June 16, 1961, Ser. No. 117,571
2 Claims. (Cl. 74—89)

This invention relates to devices for adjusting thermostats, such for example as are used on automatic clothes dryers.

An object is to produce a new and improved device for effecting rectilinear adjustment of a thermostat or the like in response to rotary actuation of a control member and for effectively retaining the same in position of adjustment regardless of jars or vibration imparted to the device.

Another object is to produce a sheet metal adjusting assembly having relatively oscillatable parts so constructed and arranged that axial movement is imparted to a member in response to rotary motion, detent means being provided for releasably holding the parts in position of adjustment.

A further object is to provide an assembly having parts fitting together in a novel manner forming a self-sustaining unit which has cam means for translating rotary motion into rectilinear motion and has novel resilient detent means for retaining the parts in adjusted position.

Other objects and advantages of the invention will hereinafter appear, and for purposes of illustration but not of limitation, an embodiment of the invention is shown on the accompanying drawings, in which—

FIGURE 1 is a side elevation of a thermostat adjusting device showing the device in assembled relation, but without the thermostat tube in place;

FIGURE 2 is a composite perspective view of the assembly shown in FIGURE 1, showing the component parts in relative position;

FIGURE 3 is a side elevation of the adjusting unit;

FIGURE 4 is an enlarged fragmentary transverse sectional view along the line 4—4 of FIGURE 3;

FIGURE 5 is a plan view of the adjusting element shown on FIGURE 3;

FIGURE 6 is a side elevation of the air control member, which forms a part of the assembly;

Figure 7:
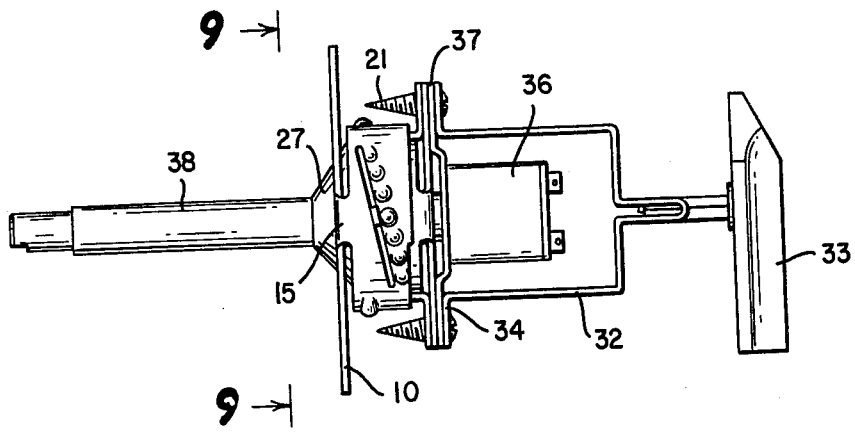
FIGURE 7 is a side elevation of the thermostat adjusting assembly, showing the thermostat mounted in the assembly, and the thermostat tube also forming a part of the assembly, this figure also showing the handle for manually adjusting the device.
Figures 8, 9:
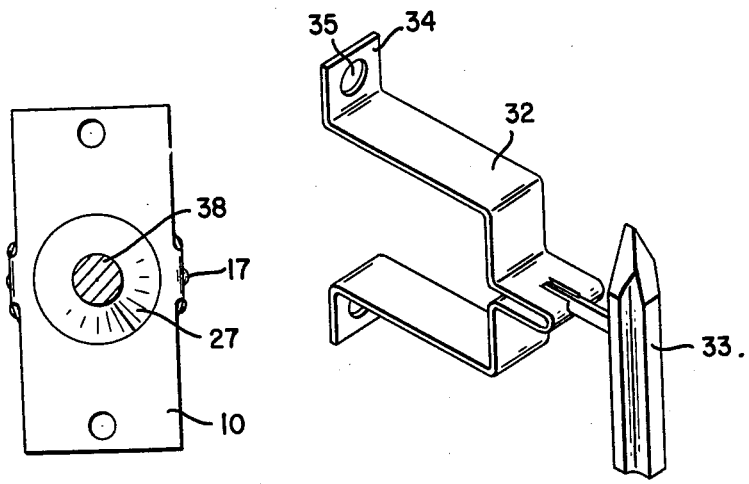
FIGURE 8 is a perspective view of the bail-like member which attaches to the unit for adjusting same and the finger piece or handle which is grasped for effecting the desired adjustment.
FIGURE 9 is a transverse sectional view substantially on the line 9—9 of FIGURE 7.
Figure 10:
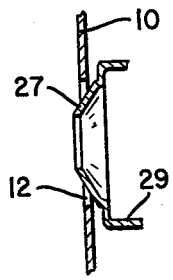
FIGURE 10 is a fragmentary sectional view showing the air control member associated with the aperture in the mounting plate.

The illustrated embodiment of the invention comprises a thermostat adjusting device for enabling the thermostat tube used, for example, in automatic clothes dryers, to be adjusted for creating different degrees of dryness for the clothes. As shown, a flat sheeet metal mounting plate 10 is provided with a pair of holes 11 to receive fasteners for securing the same in a fixed position within a suitable housing, such for example, as the housing of an automatic dryer. The plate 10 is formed with a central hole 12, and as shown, the plate is oblong. Intermediate the two longer sides of the plate 10 are arcuate segments 13 and 14 arranged at right angles to the plane of the plate. Each segment conforms approximately to a semicircle with the ends spaced from each other, as indicated on FIGURE 5. These segments are resiliently flexible so that they may be flexed to enter another part, as will hereinafter appear. An integral neck 15 provides a connection between the central portion of each of the arcuate segments 13 and 14 and an intermediate portion of the side edges of the mounting plate 10.

Each of the arcuate segments 13 and 14 is formed with a relatively straight cam slot 16, the slots extending in opposite directions for the respective segments. Disposed along the outer side of each slot 16 and in close juxtaposition to the respective slot is a series of closely spaced outwardly pressed, concavo-convex nubbins or detents 17. It will be observed that each series of detents 17 extends substantially the full length of the respective slot.

On each of the arcuate segments 13 and 14 and at the free edge thereof, close to the edge juxtaposed to the mounting plate 10 and disposed on the side edge of the respective flange of the high point of the cam slot is a tapered guide groove 18. These guide grooves receive actuating ears on the oscillatable part of the assembly, which is now to be described.

The actuating part of the assembly comprises a flat sheet metal mounting plate 19, which has a pair of spaced fastener-receiving holes 20, which, as will hereinafter be described, receive fasteners for securing a bail-like yoke or handle for imparting turning movements to the plate 19 and associated parts. Screws 21 are shown extending through the holes 20, clamping a yoke 32 in position, and engaging another member which will be hereinafter described. The adjusting plate 19 is provided with a pair of integral, arcuate coaxial segments 22, the ends of which are inwardly bent as indicated at 23. As shown, the ends of the respective segments 22 are spaced substantially from each other and are disposed at right angles to the plate 19. The central portion of each of the arcuate segments 22 is integrally connected to the adjacent edge of the adjusting plate 19 by a neck 24. Thus, it will be understood that the arcuate segments 22 are resiliently flexible, and fit or telescope within the arcuate segments 13 and 14 of the bracket element, as will hereinafter appear.

Midway of the ends of each arcuate segment 22 is an outwardly struck ear 25, and adjacent thereto is an outwardly pressed concavo-convex nubbin or detent 26. The ears 25 extend into the respective cam slots 16 in the arcuate segment 13 and 14, and the detents 26 snap into engagement with one or another of the outwardly pressed nubbins or detents 17 of the flanges 13 and 14, thereby to retain the adjusting plate 19 in its position of adjustment.

Under some conditions, it is desirable to interpose between the bracket member and the adjusting member, an air control member. As shown, the air control member comprises an apertured, truncated sheet metal cone 27, which has a cylindrical wall 28, substantially to fit the hole 12 in the bracket plate 10. Integral with the base of the truncated cone is a pair of legs 29, which are parallel to each other and extend rearwardly from the cone. The legs terminate in outwardly extending feet 30, which have integral nut impressions 31. The legs are adapted to extend into the space between the arcuate segments 22 so that the nut impressions line up with the holes 20 to enable the screws 21 to extend into same for securing these parts together to form a unit.

The arcuate segments 22 may be flexed sufficiently to enable them to enter inside the segments 13 and 14 carried by the mounting plate 10. The adjusting ears are inserted in the space between the flanges 13 and 14. When the ears 25 line up with the respective tapered guide grooves 18, a turning motion is imparted to the plate 19 forcing the ears 25 to flex the segments until the ears snap into the respective cam slots 16 at the lower ends thereof. After this has been achieved, the parts are in assembled relation. By turning the plate 19 in the proper direction the ears travel upwardly along the respective cam slots, causing the plate 19 to move farther away from the plate 10. On the other hand, by turning the plate 19 in the opposite direction so that the ears 25 travel toward the lower end of the cam slots, the plates 19 and 10 are moved relatively closer to each other.

As shown in FIGURE 7, turning movement may be imparted to the plate 19 by the yoke 32, to which a finger piece 33 is suitably fixed. In practice, the finger piece 33 which has a pointed end, may travel along a calibrated dial (not shown) which designates the positions for effecting a greater or lesser degree of heat for the dryer. The yoke 32 has flange feet 34 which have apertures 35 through which the screws 21 pass.

As shown in FIGURE 7, a thermostat 36 is shown, carried by bracket plate 37, which is also clamped between the feet 30 of the truncated cone 27 and the adjusting plate 19. The thermostat 36 has an elongate tube 38 which is moved inwardly and outwardly according to the direction of turning movement imparted to the plate 19 and associated parts. As shown, the tube extends through the hole in the truncated cone 27, and through the hole 12 in the bracket plate 10. When the cone 27 is moved close to the hole 12, the air travel is accordingly reduced and when brought into engagement with the edges of the hole, the air flow in the dryer is greatly restricted.

From the above description, it will be manifest that relatively simple adjustment of the thermostat tube can be made, and the particular adjustment selected will be retained because of the positive engagement between the nubbins or detents on the relatively moveable members. The inner or outer movements or adjustments of the thermostat tube are controlled by rotation of the adjusting plate 19 and associated parts. It should be understood that under some conditions the truncated cone 27, which serves as an air control member, may be omitted, in which event nut impressions may be formed in the plate 19 for receiving the screws 21.

Numerous changes in details of construction, arrangement, and operation without departing from the spirit of the invention, especially as defined in the appended claims.

What I claim is:

1. Adjusting device comprising an apertured mounting plate adapted to be secured in fixed position, a pair of arcuate segments at one side of said plate and coaxial with the aperture therein, a cam slot in each segment, the slot in one segment inclining from a point adjacent the plate to the outer edge portion of the segment and the other slot being reversely inclined, an apertured adjusting plate, a pair of arcuate segments on one side of said adjusting plate adapted to interfit with the segments of the mounting plate, an outwardly projecting tab or ear on an intermediate portion of each segment of the adjusting plate for engaging respectievly in the cam slots of the segments of the mounting plate so that turning of the adjusting plate in one direction or the other effects axial movement thereof, a series of concavo-convex detents along one side of each cam slot, and a nubbin adjacent each of said ears arranged to snap into a detent for frictionally retaining the parts in adjusted position.

2. Adjusting device comprising a relatively stationary mounting part having a sheet metal plate having a central aperture, a pair of arcuate spring segments at one side of the plate, a neck providing an integral connection between a midportion of each segment and an edge portion of said plate, a relatively straight cam slot in each segment extending from the inner to the outer edge thereof and the inclination of the slot on one segment being reversed from that of the other segment, a row of outwardly extending depressions along each slot, an oscillatable adjusting part having a sheet metal plate, a pair of arcuate segments at one side of said last plate to telescope into the segments on the mounting plate, a neck providing an integral connection between a midportion of each of said last segments and an edge portion of said adjusting plate, an outwardly-struck ear on a central portion of each of said last segments extending into said cam slots respectively, and an air control member secured to said adjusting plate and having a truncated cone adapted to fit the aperture in said mounting plate and movable toward and away from same in response to turning movements of said adjusting plate.

References Cited in the file of this patent

UNITED STATES PATENTS

| | | |
|---|---|---|
| 1,445,335 | McIntosh | Feb. 13, 1923 |
| 1,720,224 | Lessler et al. | July 9, 1929 |
| 2,778,229 | Simpson et al. | Jan. 22, 1957 |